United States Patent
Tzadok

(10) Patent No.: US 10,732,726 B2
(45) Date of Patent: Aug. 4, 2020

(54) GESTURE RECOGNITION USING 3D MM-WAVE RADAR

(71) Applicant: International Business Machines Corporation, Armonk, NY (US)

(72) Inventor: Asaf Tzadok, New Castle, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/375,564

(22) Filed: Apr. 4, 2019

(65) Prior Publication Data

US 2020/0097092 A1    Mar. 26, 2020

Related U.S. Application Data

(60) Provisional application No. 62/734,743, filed on Sep. 21, 2018.

(51) Int. Cl.
| | | |
|---|---|---|
| G09G 5/00 | (2006.01) | |
| G06F 3/01 | (2006.01) | |
| G01S 13/88 | (2006.01) | |
| G06N 3/04 | (2006.01) | |
| G01S 7/41 | (2006.01) | |

(52) U.S. Cl.
CPC ............. *G06F 3/017* (2013.01); *G01S 7/415* (2013.01); *G01S 7/417* (2013.01); *G01S 13/88* (2013.01); *G06N 3/0454* (2013.01)

(58) Field of Classification Search
CPC .......... G06F 3/017; G01S 7/415; G01S 7/417; G01S 13/88

USPC ......................................................... 345/156
See application file for complete search history.

(56) References Cited

U.S. PATENT DOCUMENTS

| | | | |
|---|---|---|---|
| 9,971,414 B2 | 5/2018 | Gollakota et al. | |
| 2014/0347491 A1* | 11/2014 | Connor ................. | A61B 5/1114 348/158 |
| 2016/0041617 A1* | 2/2016 | Poupyrev ............... | G01S 13/04 345/156 |
| 2016/0054804 A1* | 2/2016 | Gollakata ............... | G06F 3/017 345/156 |
| 2017/0161607 A1 | 6/2017 | English et al. | |
| 2017/0206405 A1* | 7/2017 | Molchanov ........ | G06K 9/00355 |
| 2018/0005136 A1* | 1/2018 | Gai ......................... | G06F 21/55 |
| 2018/0018588 A1* | 1/2018 | Dalton ................... | G06N 5/047 |
| 2018/0113196 A1* | 4/2018 | Subburaj ............... | G01S 7/4021 |
| 2018/0188938 A1* | 7/2018 | Deselaers ............. | G06N 3/0454 |
| 2018/0224980 A1* | 8/2018 | Avila ..................... | G01S 13/876 |

(Continued)

FOREIGN PATENT DOCUMENTS

WO    WO 2017/156852 A1    9/2017

OTHER PUBLICATIONS

Lien, et al.,"Soli: Ubiquitous Gesture Sensing with Millimeter Wave Radar", ACM Trans. Graph., vol. 35, No. 4, Article 142d, Publication Date: Jul. 2016.

(Continued)

*Primary Examiner* — Jonathan M Blancha
(74) *Attorney, Agent, or Firm* — Joseph Petrokaitis, Esq.; McGinn IP Law Group, PLLC

(57) ABSTRACT

A method for a Human-Computer-Interaction (HCI) processing includes receiving data derived from reflected signals of a steerable-beam antenna and processing the received data in a deep learning machine architecture.

20 Claims, 6 Drawing Sheets

(56) References Cited

U.S. PATENT DOCUMENTS

2019/0171871 A1* 6/2019 Zhang ..................... G06T 7/75
2019/0213789 A1* 7/2019 Uyyala ................. G06T 7/215

OTHER PUBLICATIONS

Shirakawa, et al., "3D Scan Millimeter-Wave Radar for Automotive Application" http://www.denso-ten.com/business/technicaljournal/pdf/38-1.pdf, Fujitsu Ten Technical Journal, No. 38, 2013.
Pedro Melgarejo, et al., "Leveraging Directional Antenna Capabilities for Fine-Grained Gesture Recognition", UBICOMP'14, Sep. 13-17, 2014, Seattle, WA, pp. 541-551.
"Multiplexing Millimeter-Wave Beams for 5G Technology", Jun. 2015, https://ibm.anaqua/Document/DocumentLoad.aspx?FileId=5109653&FileName=Multiplexing%20millimeter-wave%20beams%20for%205G%20technology.pdf.

\* cited by examiner

Voxel Representation of 3D Tensor

2D Color Map Representation of 3D Tensor

GESTURE RECOGNITION USING 3D MM-WAVE RADAR

This Application claims priority to Provisional Application Ser. No. 62/734,743, filed on Sep. 21, 2018.

BACKGROUND

The present invention relates generally to natural Human-Computer-Interaction (HCI) such as Augmented Reality (AR) or Virtual Reality (VR) systems. More specifically, hand gesture recognition is provided using a millimeter (MM) radar (e.g., a phased array transceiver) that provides data into a trainable recurrent three-dimensional (3D) convolutional neural network (CNN).

Natural hands-free HCI has been a technological challenge for years. More than ever before, it has become crucial because of recent advances in AR and VR. Hands gesture recognition remains a live research domain. Much of the research in this area has focused on recently-available off-the-shelf sensing modalities. The most matured methods are, for example, using stereo RGB cameras or infrared-based proximity sensors. Also, ultrasound imaging has enabled a hand pose detection method using wearable devices, capturing muscle movements and applying classification on motion flow of muscles using optic flow. Such ultrasonic depth imaging for hand gestures suggest using a separate 2D CNN pipeline for intensity and depth before an LSTM (long short-term memory unit, as commonly used in recurrent neural networks to remember a cell value over a preset time interval).

Microsoft has been able to show a promising solution in their Hololens system, which provides a stereoscopic head-mounted display receiving holographic signals from a computer. However, this solution allows only 2.5D interaction and, while it is hands-free, it does not allow natural interaction in the 3D space. This is due to the limitation of the sensing techniques being used, by combining structure light and the visual domain. This combination allows access only to the frontal facing surfaces and cannot see anything beyond that front surface. This means that a two-hands operation, where one hand occludes the other, is not possible.

Google has developed Soli, which is a very short range, hyper-wide-bandwidth (7 GHz) dedicated chip that can detect fine movements close to the sensor, which can be used to virtually control a mobile device. The technical pipeline includes extracting range-doppler images (RDI), applying advanced preprocessing to improve the signal and extract basic features, and then feeding into a machine language pipeline. Two RDI images are processed using CNNs, similar to the technique used in image recognition systems. Four basic gestures with clear distinct signatures were demonstrated. However, this solution is less practical with a more natural AR/VR interaction, due to its wide-angle response. Also, orientation is a challenge with Soli, due to the small number of elements. Thus, although Soli consumes low power and works great in very close proximity applications such as controlling a mobile device, its limited distance effectiveness would not be suitable for AR/VR applications.

SUMMARY

According to an exemplary embodiment, the present describes a method for a Human-Computer-Interaction (HCI) processing, including receiving data derived from reflected signals of a steerable-beam antenna; and processing the received data in a deep learning machine architecture.

Also described herein is a Human-Computer-Interaction (HCI) system, including a transceiver implementing a steerable-beam antenna pattern as a radar sensor; and a processor for executing a convolutional neural network (CNN) processing of data received by a receiver of the transceiver.

Also described herein is a data structure, as tangibly embodied in a predetermined format and organization in a non-transitory memory device, the data structure comprising data derived from reflected signals of a steerable-beam antenna pattern as a four-dimensional (4D) tensor.

DETAILED DESCRIPTION

Figure 1:
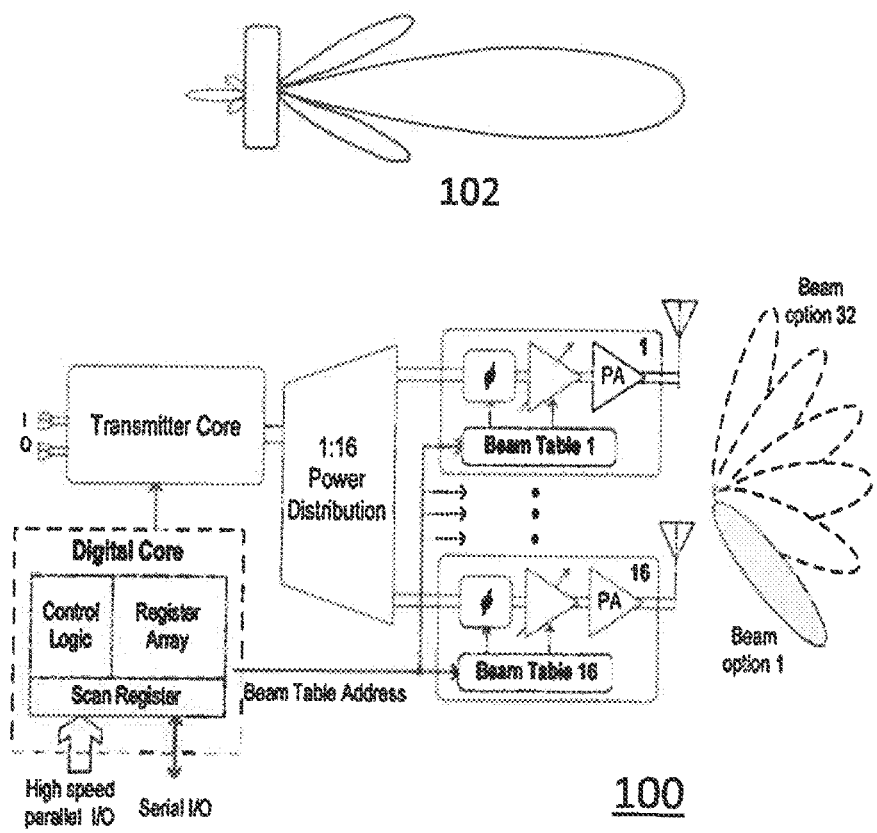
FIG. 1 exemplarily shows a phase array antenna propagation pattern and generic steerable radar system used in an exemplary embodiment of the present invention.

With reference now to FIG. 1 and in contrast to the conventional methods described above for natural HCI, the present invention is based on a different principle of operation, one that provides a cognitive 3D radar system 100 having a capture solution that is capable of steering a narrow radar beam and capturing a fast 3D return radar signal. The time sequence series data of the returning signal is then fed into an artificial intelligence (AI) architecture which is executing a unique time sequence volumetric classification (e.g., a 4D tensor), using a trainable recurrent 3D convolutional neural network (CNN).

The AI architecture allows training of challenging natural two-hands gestures, while using a relatively narrow (compared to the 7 GHz of Soli) bandwidth of 1 GHz. This narrow bandwidth allows using a conventional communication baseband, which is advantageous for at least three reasons: 1) It allows more users to share the same environment; 2) It increases the effective range (1-6 feet); and 3) It uses the same communication chip for both radar and communication.

Thus, the method described herein is for HCI generally, for any hand gesture recognition application within 1-6 feet distance, including such applications as controlling a computer or a robot, and the experiments described herein demonstrates its usefulness for AR and VR applications. More generally, the technical limitation of the method of the present invention is the formation of the radar beam which realistically requires approximately one foot from the antenna of the radar, with the prototype configuration providing effective results in the range of approximately 15 to 105 cm.

The radar chip of the present invention uses a phase array antenna propagation pattern 102 such as exemplarily demonstrated in FIG. 1. Such pattern provides a 3D radar output that, in the short range used in the present invention, provides a radial-shaped voxel response. The voxel's volume is increased as a square of the range. The range resolution is 15 cm, defined in the 1 GHz allocated baseband bandwidth. In a demonstration prototype of the present invention, the angular steps of the voxels are 5 degrees both horizontally and vertically, and, using all 16 elements of the transceiver antenna, there is approximately a 20-degree lobe width for the main lobe.

It is noted that, although the method and algorithms used in explaining the present invention involves the 1 GHz bandwidth, such bandwidth is not to be considered as a limitation for this method. Rather, it is noteworthy that the present invention has been demonstrated as being efficient even under this narrow bandwidth condition.

Experiments using prototype configurations have demonstrated that hands gestures receive good radar response in a range between 15-105 cm from the sensor. In one non-limiting demonstration prototype configuration, a 5×5 beam-directions per frame was used, with more than 30 degrees field of view (FoV). A machine learning architecture receives the 3D radar data as a data structure and is able to detect hand gestures that can be concentrated in a 20-50 cm cube using a relatively coarse resolution. In one exemplary prototype configuration, 50 frames per second (FPS) were captured, with 25 (5×5) beam directions per frame. The selected volume for the prototype experiments used seven range cells per beam direction, covering the intended 15-105 cm range.

However, it is again noted that the present invention is explained under the very narrow bandwidth of 1 GHz. With wider bandwidth the range on the matrix dimensions described above will be longer although directivity will still depend upon the phase array control of the beam pattern and would not benefit from wider bandwidth.

Figure 2:
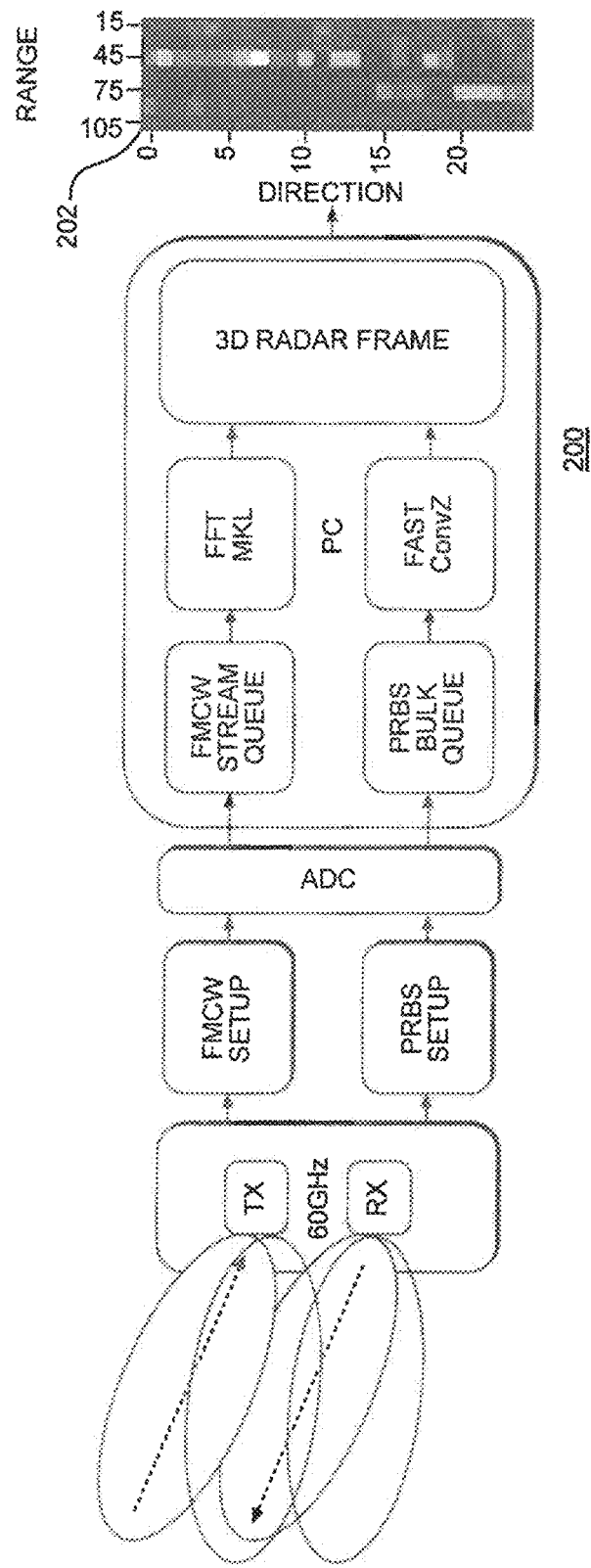
FIG. 2 exemplarily shows in block diagram format an exemplary embodiment of the signal acquisition pipeline 3D radar used in the present invention.
Figure 3:
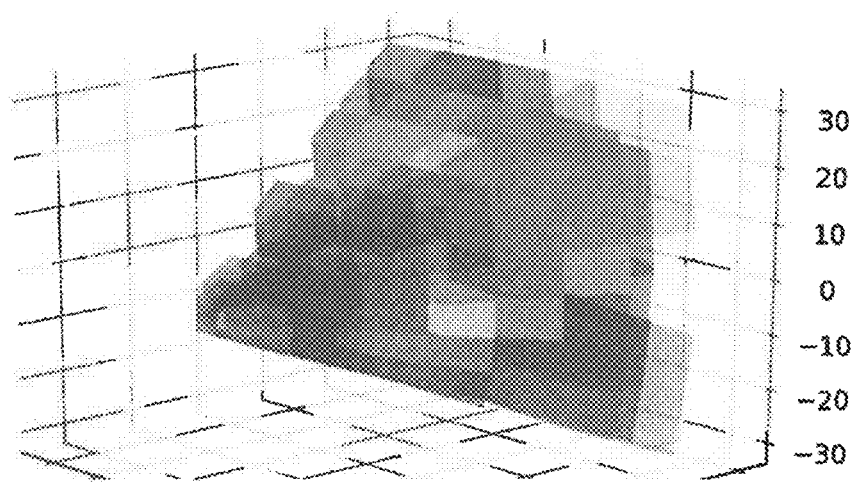
FIG. 3 shows a second exemplary representation of a single frame of 3D radar, which is the basis of the 4D tensor data, using a voxel representation, as well as the 2D color representation shown in FIG. 2.
Figure 3:
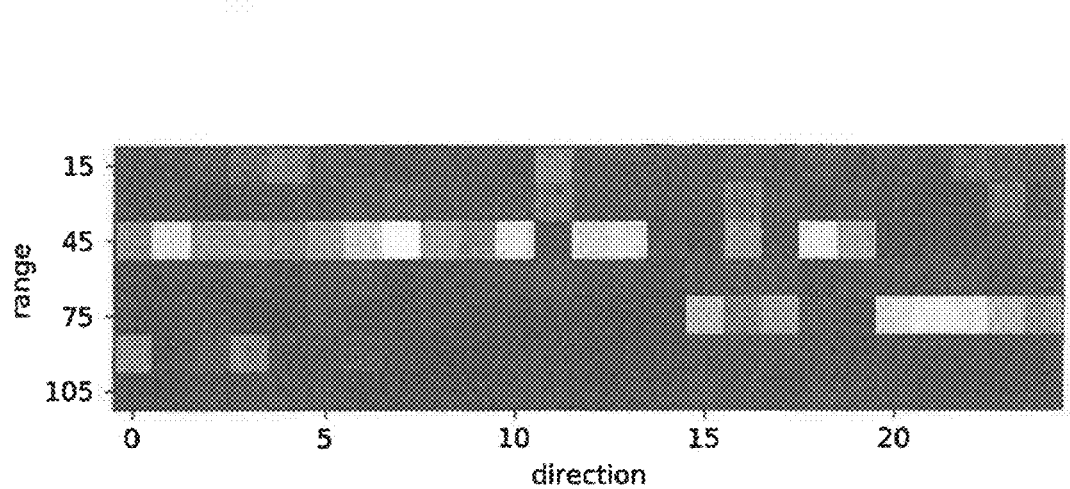

FIG. 2 shows in block diagram format 200 the overall capture system of an exemplary embodiment of the present invention. The phased array transceiver board 202 shown on the left side uses well-known radar techniques, such as frequency modulated continuous wave (FMCW) or pseudo-random binary sequence (PRBS), to obtain an output frame 204 on the right side, which is a volumetric response from 25 beam directions. The beam direction is stepped over a 5×5 grid in the X and Y directions, and for each of these 25 beam directions, the resulting output is binned into one of seven depth regions. The output data can be represented as a 2D color map 202, where the 25 directions and seven depth bins are displayed as a 7×25 image, making 175 data points per frame. A volumetric representation of the same data can be presented as 3D voxels, as exemplarily shown in FIG. 3. Whether stored as 2D color map data or 3D voxels, the conditioned output data from the sensor section, which is more generally described herein as being a 4D tensor, is stored as a data structure in a memory device for presentation as input data into the subsequent stage with a CNN processing. More technically, the 4D tensor of the present invention is generally defined as meaning nFrames×iVerticalDirections×jHorizontalDirections×kDepth. Thus, in the exemplary demonstration setup configuration, the 4D tensor exemplarily had specific dimensions 30×5×5×7. It is noted that, if the bandwidth is higher (wider) than the exemplary 1 GHz configuration, then the depth dimension would increase. Additionally, it is noted that the depth dimension could include additional information such as phase information.

In a non-limiting exemplary embodiment, the system predicts every frame based on the last 30 frames (5×5×7 each). Overall, the input vector per inference is 5250 (5×5×7×30), and the temporal dimension is the dominant contributor. Given the small scale of the input data, in order to extract high level features, it was desirable to expand the temporal dimension and then design architectures incorporating deep networks. In one exemplary embodiment, a deep 3D convolution network extracted temporal and volumetric features and stacked LSTMs detected temporal trends.

Figure 4:
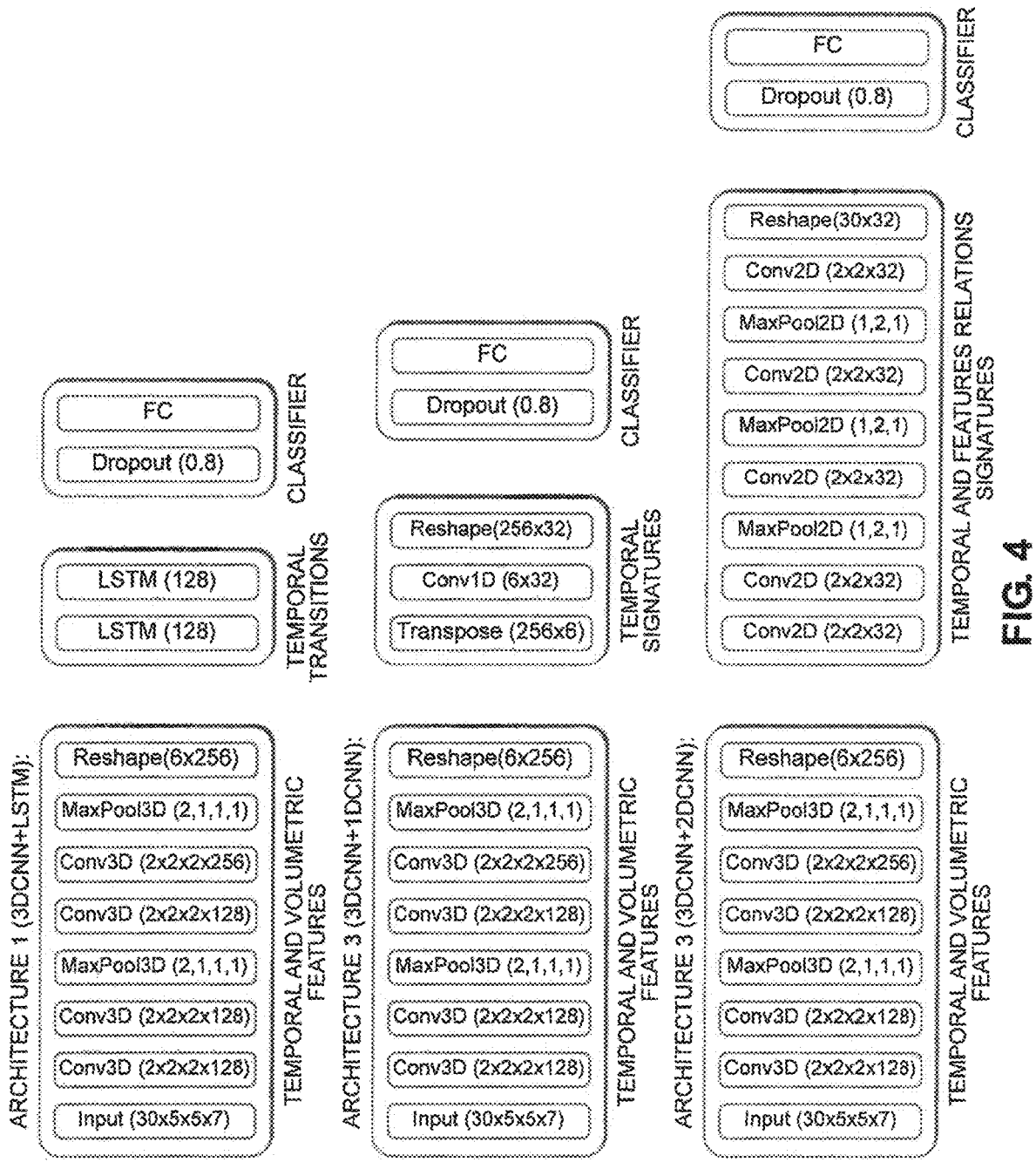
FIG. 4 shows various exemplary machine learning architectures used in exemplary prototype configurations of the present invention.

FIG. 4 shows various exemplary, non-limiting machine learning architectures used in various prototype configurations. The first exemplary architecture comprises a 3D CNN plus the time delay LSTM module, followed by the classifier module. The second exemplary architecture comprises a 3D CNN, a 1D CNN, and classifier module, and the third exemplary architecture comprises a 3D CNN, a 2D CNN, and classifier module. In subsequent training exercises, the second and third architectures outperformed the first architecture. Although these 1D CNN, 2D CNN, 3D CNN, LSTM components, or variations thereof, are readily understandable by one having ordinary skill, the present invention is also intended to have an exemplary embodiment using a 4D CNN machine learning component.

To capture data for each gesture, 30 seconds of data was recorded for each of the distinctly different gestures being trained for classification, using 50 frames per second (FPS, thereby providing 1500 frames (30×50) per gesture. In these demonstrations, a user was requested to execute dynamic hand gestures to preform one of eight hands gestures: (1) back-and-forth movement; (2) movement between left-bottom to top-right; (3) movement between left-top to bottom-right; (4) resize-depth; (5) resize-width; (6) rotate; (7) rotate and hold; and (8) waving.

Every training and testing sample consisted of 30 consecutive frames, so that 1470 training/testing samples could be extracted from each record. Twelve records were collected for each gesture per person for each of nine gestures and nine persons used in the experiments, making a total of 12×9×9×1470 samples for training and testing.

As a result of the training and testing on a prototype, an accuracy of 98% recognition rate was achieved with a range resolution of 15 cm. During these demonstrations, it was noted that when two different people performed the same semantic gesture differently, for example, waving and moving from left-bottom to top-right, the two classes could become ambiguous. Such potential ambiguity permits a user to become aware of possible ambiguity in their intended gesture, thereby permitting that user to decide whether to modify their gesture or, in a preferred embodiment, to personalize the system classification engine to train a new gesture(s).

The present invention allows successful learning for gesture classification using only a small amount of radar data, compared to an ultra-wide bandwidth radar. The input tensor of the present invention has a very small dimension to begin with, especially for a 4D tensor (30×5×5×7), where the temporal dimension is the main contributor. For comparison, an ultra-wide bandwidth radar would produce a high resolution down-sampled frame of 224×224 (50,176 pixels), which is almost 300 times larger than the 5×5×7 (175 pixels) frame of the present invention. The machine learning architecture leverages the phased array beam steering capability to classify HCL gestures into defined classes. Gestures involving either one hand or two hands have been demonstrated. The demonstration results show that high recognition rates are achievable even without use of radar techniques that would generate large input data sets.

Although details of the prototype configuration were described above, such details should be considered exemplary only, since it should be clear to one having ordinary skill in the art that various modifications, such as changing the number of voxels used, switching from FMCW to PRBS, using a narrower bandwidth to provide addition robustness to jamming, etc., would be possible. A key feature of the invention is its application of using a mm-wave radar to provide input data into a machine learning architecture for natural HCI applications.

Figure 5:
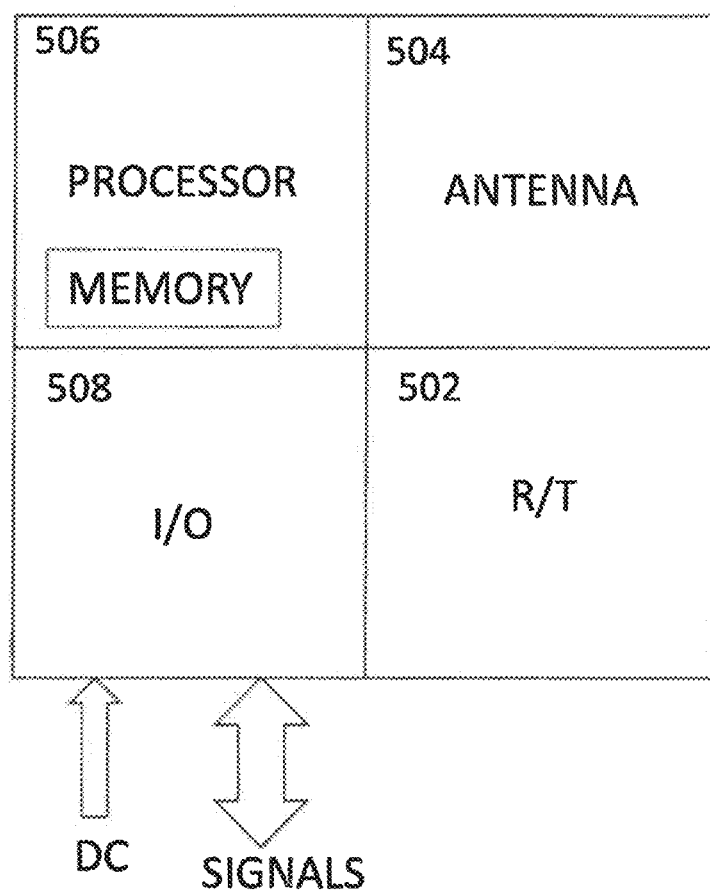
FIG. 5 shows in block diagram format a system configuration of an exemplary embodiment of the present invention.

The prototype configuration of the present invention used existing mm-wave phased array transceivers that were designed for 5G communication, with relatively narrow bandwidth to allow sharing between multiple users. The mm-wave communication is expected to hit the market in the next few years, due to the increased need for high speed communications. The 5G mobile communications is expected to run on networks operating in the 60 GHz mm-wave band. While the 60 GHz wave cannot pass through a wall as can 2.4 GHz, it allows, through a small form factor array of antennas, to narrowly steer the beam for both improved energy efficiency and high speed flow. This will increase the demand for phased array technology in the 60 GHz frequency within a few years, so that the present invention will provide an HCI solution that conveniently fits into this upcoming technology, without having a potential jamming between multiple users, as might be expected with the 7 GHz bandwidth of the Google Soli technique. FIG. 5 shows exemplarily in block diagram format 500 a generic system implementing the present invention with radar R/T module 502 and its associated antenna 504. As mentioned, such radar systems are currently available and can be mounted as a chip in a small package. The processor 506 provides control of the radar transceiver and executes the machine learning modules on the data received and stored in the associated memory device. The I/O section 508 provides power and user interface into the system.

Figure 6:
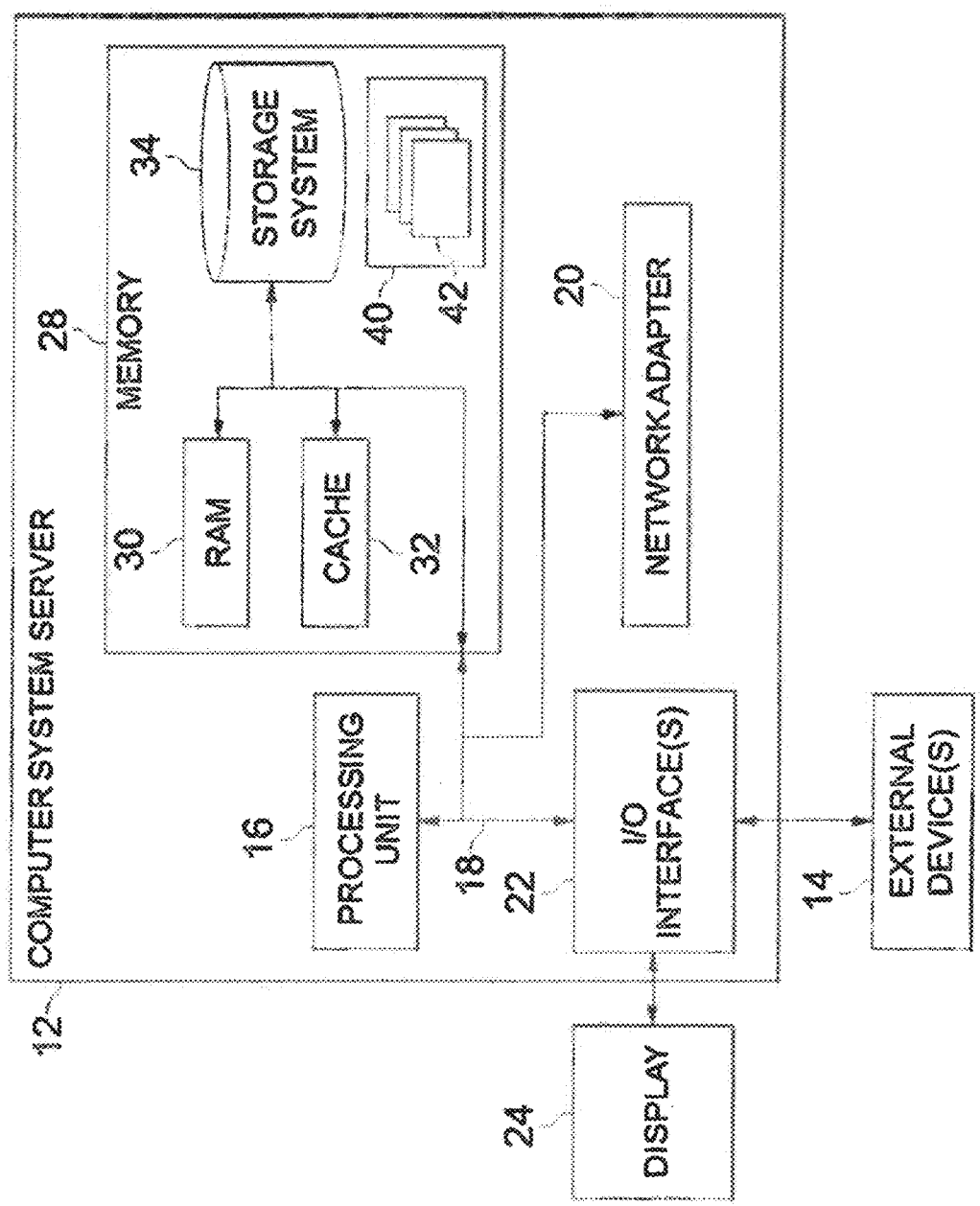
FIG. 6 exemplarily shows a computer configuration that could be used for implementing the machine learning aspects of the present invention.

Although the system shown in FIG. 5 could be a stand-alone system with a processor 506 dedicated to the control and processing of the 3D radar 502, 504, the system processor 506 could also comprise a generic computer with a program directed to implementing the method of the present invention, such as exemplarily shown in FIG. 6.

As shown in FIG. 6, the computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. As shown in FIG. 6, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

The present invention also provides an RF-based solution for HCI because of its capabilities to see through, permitting hand gesture recognition technique for both one-hand and two-hand gestures, which RF-based solution also provides a fast response time due to a fast frame rate 2-100K frame-per-second (FPS) capability.

Thus, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. A method for a Human-Computer-Interaction (HCI) processing, said method comprising:
   receiving data derived from reflected signals of a steerable-beam antenna; and
   processing the received data in a deep learning machine architecture which executes a unique time sequence volumetric classification.

2. The method of claim 1, wherein the reflected signals comprise data for a two-hands gestures recognition capable of distinguishing between a plurality of possible hand gestures including both one-hand and two-hand hand gestures, including two-hand hand gestures in which a first hand occludes a second hand during at least a portion of the gesture.

3. The method of claim 1, wherein the deep learning machine architecture comprises a convolutional neural network (CNN) processing providing a volumetric and temporal analysis of the received data, and
   wherein the deep learning machine architecture, which executes the unique time sequence volumetric classification using the (CNN).

4. The method of claim 3, wherein the CNN processing comprises:
   a first processing stage comprising at least one three dimensional (3D) CNN processing (3DCNN);
   a second processing stage for detecting at least one of temporal transitions, temporal signatures, and temporal and features relations signatures; and
   a third processing stage comprising a classifier processing.

5. The method of claim 1, wherein the HCI processing is effective beyond one foot from the steerable-beam antenna.

6. The method of claim 1, wherein the received data is stored in a memory device as a data structure representing a four-dimensional (4D) tensor.

7. The method of claim 6, wherein the 4D tensor comprises a plurality of 3D radar frames.

8. The method of claim 1, as applied in one of: an augmented reality (AR) system; a virtual reality (VR) system; a hand gesture recognition system; a robot control system; and a computer control system.

9. A Human-Computer-Interaction (HCI) system, comprising:
   a transceiver implementing a steerable-beam antenna pattern as a 3D radar sensor; and
   a processor for executing a unique time sequence volumetric classification via a convolutional neural network (CNN) processing of data received by a receiver of the transceiver.

10. The HCI system of claim 9, wherein the radar sensor operates at a bandwidth of 1 GHz.

11. The HCI system of claim 10, as comprising a two-hands gestures recognition system capable of distinguishing between a plurality of possible hand gestures including both one-hand and two-hand hand gestures.

12. The HCI system of claim 10, wherein the radar sensor captures data at a rate of approximately 50 3D radar frames per second (FPS).

13. The HCI system of claim 12, wherein the radar sensor captures data in a preset plurality of beam directions and each beam direction captures data in a preset plurality of range cells.

14. The HCI system of claim 9, as effective for signal returns between 1-6 feet from the radar sensor.

15. The HCI system of claim 14, as effective for signal returns between 15-105 cm from the radar sensor.

16. The HCL system of claim 9, further comprising a memory device for storing the received data as a data structure representing a four-dimensional (4D) tensor.

17. The HCL system of claim 16, wherein the 4D tensor comprises a plurality of 3D radar frames.

18. The HCL system of claim 9, as applied in one of: an augmented reality (AR) system; a virtual reality (VR) system; a hand gesture recognition system; a robot control system; and a computer control system.

19. The data structure of claim 18, as comprising a plurality of 3D radar frames, each radar frame comprising a 3D representation of voxels.

20. A data structure, as tangibly embodied in a predetermined format and organization in a non-transitory memory device, the data structure comprising data derived from reflected signals of a steerable-beam antenna pattern as a four-dimensional (4D) tensor,
   wherein the signals are processed in a deep learning machine architecture which executes a unique time sequence volumetric classification.

* * * * *